Figure 1:
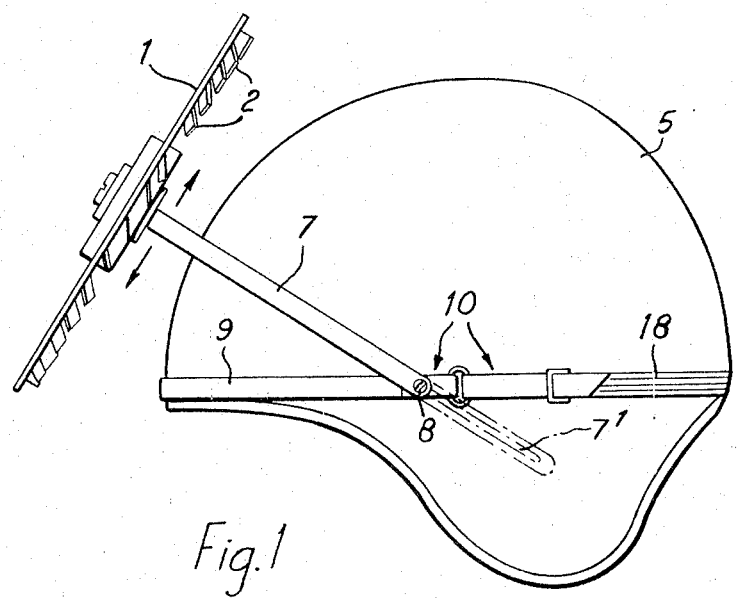

Dec. 27, 1966     L. MACKLIN     3,293,660
PROTECTIVE VISORS OR FACE SHIELDS FOR THE
DRIVERS AND OTHER OCCUPANTS OF VEHICLES
Filed Sept. 28, 1964     2 Sheets-Sheet 1

United States Patent Office 3,293,660
Patented Dec. 27, 1966

3,293,660
PROTECTIVE VISORS OR FACE SHIELDS FOR THE DRIVERS AND OTHER OCCUPANTS OF VEHICLES
Lance Macklin, 52 Gloucester Place, London, England
Filed Sept. 28, 1964, Ser. No. 399,721
Claims priority, application Great Britain, Sept. 26, 1963, 37,990/63; Nov. 20, 1963, 45,813/63
2 Claims. (Cl. 2—9)

This invention relates to protective visors or face shields for the drivers and other occupants of vehicles. The term "vehicles" used herein is intended to denote not only wheeled vehicles, such as, cycles, mopeds, motor-cycles and motor-cars, but also water craft, such as motor-boats, speed-boats and the like.

For the sake of brevity, however, in the following description, reference is made particularly to the use of the device for motor cyclists, but it is to be understood that the invention is not limited to such application, being equally applicable to drivers and other occupants of vehicles as hereinbefore defined.

The protective visor or face shield with which the present invention is concerned is of the kind which is adapted to be worn on the head of the user to protect the eyes and face thereof against wind, rain and dust or other injurious particles or matter.

Visors of the foregoing kind usually take the form of a curved shield of flexible transparent material detachably mounted around the front brim or edge of, for example, a crash helmet or the like and depending over at least the eyes of the wearer. The known visors suffer from the disadvantage that the vision of the wearer is impaired during rain by the water adhering to the surface of the visor.

The present invention aims at obviating the foregoing disadvantages by providing a visor which will automatically be kept substantially free of raindrops and other particles thereby maintaining a substantially clear vision for the rider or driver under adverse weather conditions.

To this end, the invention consists in a protective visor or face shield for the drivers or other occupants of vehicles as hereinbefore defined, which comprises a transparent disc freely rotatably mounted on a carrier adapted to be worn on the head of the user in a position to cover at least the eyes of the wearer, and having wind vanes adapted to cause rotation of said disc due to a current of air produced by forward movement of the vehicle.

The invention also consists in a protective visor or face shield for drivers or other occupants of vehicles as hereinbefore defined, which comprises a transparent disc freely rotatably mounted on a carrier adapted to be mounted on a crash helmet or the like in a position to cover at least the eyes of the wearer, and having wind vanes arranged around or adjacent the periphery thereof, said vanes being adapted to cause rotation of the disc due to a current of air produced by the forward motion of the vehicle carrying the driver or other occupants.

Figure 2:
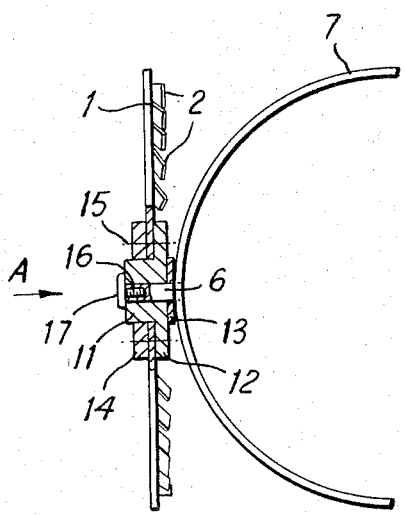
Figure 3:
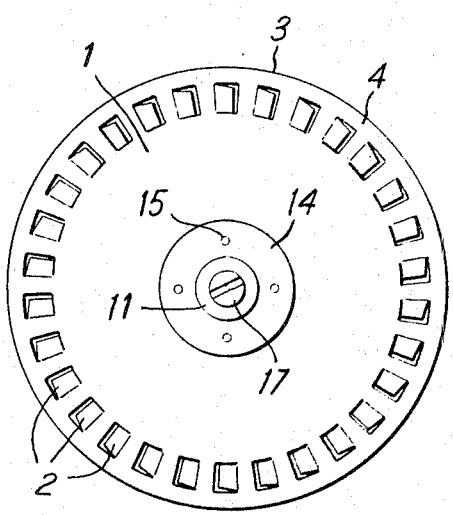
Figure 5:
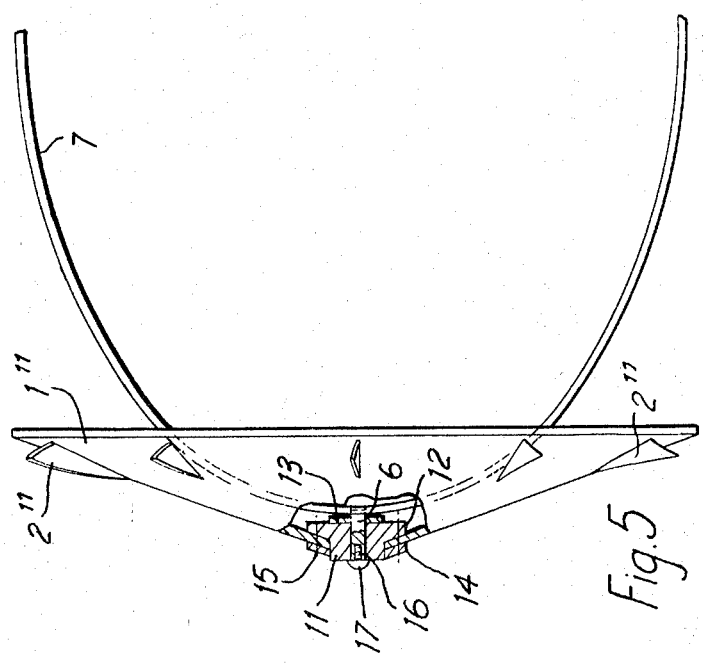
Figure 4:
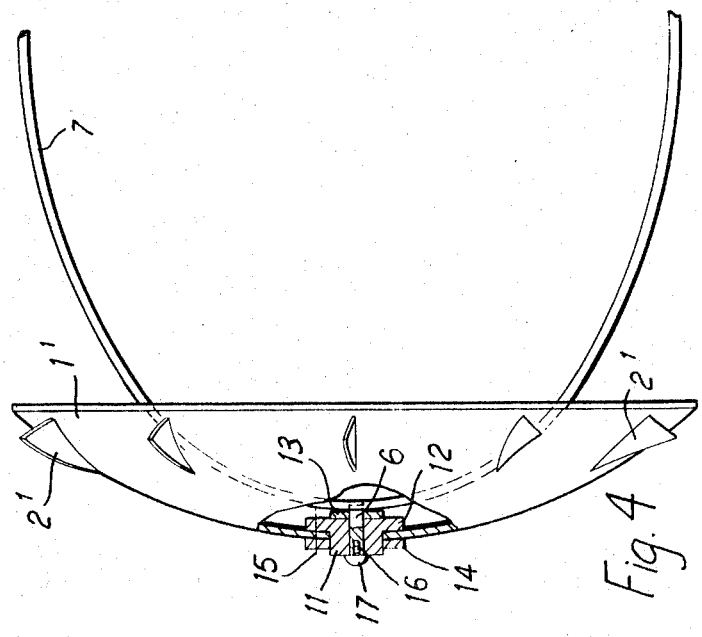

In order that the invention may be more readily understood, reference is made to the accompanying drawings which illustrate diagrammatically and by way of example, several embodiments thereof, and in which:

FIGURE 1 is a side view of a crash helmet having a protective visor rotatably mounted thereon, FIGURE 2 is a plan view, partly in section, of the mounting of the visor, FIGURE 3 is a view in the direction of arrow A of FIGURE 2, FIGURE 4 is a plan view, partly in section, of a curvedly dished visor disc and its mounting, and FIGURE 5 is a view similar to that of FIGURE 4 of a conically dished visor disc.

Referring more particularly to the drawings of FIGURES 1 to 3, a substantially flat disc 1 of clear or tinted transparent plastics material or splinter-proof glass is provided with wind vanes 2 which are arranged adjacent the periphery 3 of the disc 1, so that the vanes 2 are externally bounded by a comparatively narrow peripheral ring portion 4 of the disc 1. In an alternative construction (not shown) of the disc 1 the wind vanes are formed in the periphery of the disc and extend freely radially outwards. In such construction of the disc 1 either all, or only alternating vanes are angled. The disc 1 is adapted to be freely rotatably mounted on a crash helmet 5, of a type used by cyclists, motor cyclists, racing car drivers or drivers of powered water craft, such as speed-boats and the like, in a position to cover at least the wearer's eyes.

The rotatable mounting of the disc 1 comprises a steel spindle 6 screwed at one end or otherwise secured fast in a carrier or supporting frame 7 pivotally mounted by means of a screw 8 on a metal portion 9 of a supporting band 10 disposed on the crash helmet 5. The screw 8 clamps the frame 7 in the desired position with respect to the helmet 5. The spindle 6 carries a nylon bearing 11 which is formed with a flange 12 adjacent a washer 13 interposed between the bearing 11 and the member 7. The bearing 11 in turn carries the disc 1 and a clamping disc 14, the two last mentioned parts and the flange 12 being cemented together and/or held together against relative movement by means of pins 15, so as to be rotatable in common on the spindle 6. The outer, free end of the spindle 6 is tapped and receives a retaining screw 16 provided with a grooved head 17.

In the embodiment of FIG. 4 the protective visor or face shield comprises a transparent disc 2' which is spherically curved and constitutes a comparatively shallow dish-like member. However, the curvature of the disc may depart from a purely spherical shape. The disc 2' may be made of clear or tinted transparent plastics material or splinter-proof glass of suitable thickness.

On the external, that is the convex surface, the disc 1' is provided with a plurality of curved or inclined wind vanes 2' which are uniformly spaced around and adjacent the peripheral edge of the disc 1'. The wind vanes 2' may be, for example, moulded integrally with the spherically curved disc 1', or they can be secured to the convex surface by suitable means after producing the curved disc. It will be appreciated that in this arrangement the body of the disc remains uninterrupted so that, particularly the inner surface of the disc is entirely smooth and by virtue of the concavity enhances the vision through the disc even under the most unfavourable conditions. Furthermore the surface of the disc facing the wearer is devoid of any projections or the like and therefore is less likely to cause injury to the wearer in the event of accidents.

In the embodiment of FIGURE 5 the disc 1" is conically dished and provided on its external surface with curved or inclined wind vanes 2" which may be moulded integrally with the conically dished disc 1" or secured thereto by suitable means after producing the disc.

The embodiments of FIGS. 4 and 5, in all other respects, are similar to and operate in the same manner as that described with reference to FIGS. 1 to 3.

When a vehicle or craft carrying the wearer of the crash helmet is in motion and the disc 1, 1', or 1" is in a postion where it covers at least the eyes of the wearer, then the wind vanes 2, 2' or 2" cause the disc to be rotated about the spindle 6 so that, for example, rain or spray drops are prevented from adhering to the surface of the disc 1, being flung outwardly by the centrifugal forces produced.

By virtue of the pivtol mounting of the carrier 7 the latter together with the disc 1, 1' or 1" can be swung upwards (FIGURE 1) into an inoperative position where the disc lies substantially on the upper surface of the helmet 5. The carrier 7 comprises a substantially U-shaped and substantially rigid member mounted at its ends to the band member 10 encircling the crash helmet 5. The metal portion 9 which engages around the front of the helmet 5 is flexible and of U-shaped construction. An elastic portion 18 interconnects the free ends of the U-shaped portion 9 and secures the band member 10 to the helmet 5. In order to make the position of the disc 1 adjustable with respect to the helmet 5, the free ends of the carrier 7 may be extended (see broken lines in FIG. 1), each extension being provided with a slot 7' for receiving the screw 8.

In a modification of the invention the substantially rigid U-shaped carrier 7 is pivotally mounted at its ends directly in the sides of the helmet 5.

According to a still further embodiment of the invention, the carrier for the disc 1, 1' or 1" may comprise a flexible and/or elastic band adapted to encircle the head of the wearer, either directly on the head or over a cap or the like. If desired, means may also be provided for preventing the carrier slipping down over the wearer's forehead, as for example, by providing one or more loops adapted to pass over the top of the wearer's head.

The disc 1, 1' or 1" is detachably mounted on the carrier 7 and can be separated therefrom by removing the releasing screw 17. Furthermore the disc 1, 1' or 1" may be suitably treated in order to assist flow-off of water and to prevent abrasion of the surface of the disc. A ball or roller bearing may be used instead of the nylon bearing described in the preferred embodiments.

I claim:
1. A protective visor for drivers, comprising, in combination, band means adapted to be worn on the head of the driver and having a pair of side portions; U-shaped frame means pivotally mounted at the end portions thereof on said side portions movable between an active and an inactive position; shaft means carried by and projecting forwardly from a center portion of said frame means; securing means to secure said frame means in at least one of said positions; pivot means carried by and projecting forwardly from a center portion of said frame means; a nylon bearing means rotatably mounted on said shaft means and including a flange member at one end face thereof; a disc of transparent material mounted on said flange member for rotation therewith, and being arranged in the active position of said frame means to cover at least the eyes of the driver with its inner portion, the outer portions of said disc being backardly inclined to form a convex shape; and a plurality of vanes on said outer portions cooperating with the airstream produced during forward movement of the driver to turn said disc about its axis, whereby rain impinging on the front of said disc will be removed by centrifugal force caused by the turning movement of said disc.

2. A protective visor for drivers, comprising, in combination, a crash helmet adapted to be worn on the head of the driver and having a pair of side portions; U-shaped frame means; means detachably connecting said frame means to said side portions, said frame means being movable between an active and an inactive position; securing means to secure said frame means in at least one of said positions; shaft means carried by and projecting forwardly from a middle portion of said frame means; a nylon bearing means rotatably mounted on said shaft means and including a flange member at one end face thereof; a disc of transparent material mounted on said flange member for rotation therewith, and being arranged in the active position of said frame means to cover at least the eyes of the driver with its inner portion, the outer portions of said disc being backwardly inclined to form a convex shape; and a plurality of vanes on said outer portions cooperating with the airstream produced during forward movement of the driver to turn said disc about its axis, whereby rain impinging on the front of said disc will be removed by centrifugal force caused by the turning movement of said disc.

References Cited by the Examiner
UNITED STATES PATENTS

| | | | |
|---|---|---|---|
| 2,262,449 | 11/1941 | Buegeleisen | 2—9 |
| 2,358,934 | 9/1944 | Lee | 2—14.1 |
| 2,857,189 | 10/1958 | Jeffery | 287—85 |
| 2,963,708 | 12/1960 | Herbine et al. | 2—8 |

FOREIGN PATENTS

| | | |
|---|---|---|
| 605,325 | 9/1960 | Canada. |
| 1,108,504 | 8/1955 | France. |

JORDAN FRANKLIN, *Primary Examiner.*

R. J. SCANLAN, JR., *Assistant Examiner.*